United States Patent [19]

Smith

[11] Patent Number: 4,470,359
[45] Date of Patent: Sep. 11, 1984

[54] AUXILIARY FURNACE IN COMBINATION WITH A BOILER

[75] Inventor: Trevor D. Smith, Abergavenny, United Kingdom

[73] Assignee: Suxe Combustion Limited, Abergavenny, United Kingdom

[21] Appl. No.: 293,402

[22] Filed: Aug. 17, 1981

[51] Int. Cl.³ .............................................. F23B 7/00
[52] U.S. Cl. ..................................... 110/234; 122/15; 122/52; 122/75
[58] Field of Search ............... 110/233, 234, 235, 105, 110/108; 122/2, 15, 51, 52, 74, 75; 126/361

[56] References Cited

U.S. PATENT DOCUMENTS

| | | | |
|---|---|---|---|
| 33,057 | 8/1861 | Vavclain | 110/298 |
| 576,874 | 2/1897 | Mewes | 122/136 R |
| 757,949 | 4/1904 | Mylin | 110/299 |
| 1,082,126 | 12/1913 | Krell | 110/108 |
| 1,972,429 | 9/1934 | Shaughnessy | 110/234 |
| 3,171,388 | 3/1965 | Ganz | 122/149 |
| 3,477,411 | 11/1969 | Gething | 122/135 R |
| 3,559,597 | 2/1971 | Heiny | 122/2 |
| 3,785,304 | 1/1974 | Stookey | 110/234 |
| 3,822,651 | 7/1974 | Harris et al. | 110/234 |
| 4,206,723 | 6/1980 | Kunkel | 122/2 |

FOREIGN PATENT DOCUMENTS

| | | | |
|---|---|---|---|
| 613953 | 5/1935 | Fed. Rep. of Germany | 122/136 R |
| 774847 | 12/1934 | France | 110/118 |

Primary Examiner—Samuel Scott
Assistant Examiner—Noah Kamen
Attorney, Agent, or Firm—Parmelee, Miller, Welsh & Kratz

[57] ABSTRACT

A boiler which is designed to be fired by oil and/or gas comprises a water cooled combustion tube closed at one end and located within a water space of the boiler, is connected to a solid fuel fired boiler by an auxiliary furnace having a combustion chamber with means to introduce solid fuel into the combustion chamber, and an opening in the wall of the combustion chamber, the opening having an extension nozzle extending therefrom whereby hot gases may pass from the extension nozzle of the furnace into the combustion tube of the boiler at a position intermediate the ends of the combustion tube.

11 Claims, 4 Drawing Figures

AUXILIARY FURNACE IN COMBINATION WITH A BOILER

CROSS REFERENCE TO RELATED APPLICATIONS

My commonly assigned application Ser. No. 293,475 filed On Aug. 17, 1981 entitled "Grateless Furnace for Solid Fuel".

BACKGROUND OF THE INVENTION

Field of the Invention

This invention relates to a preburner furnace and more particularly, to a preburner furnace used to fire a boiler, and to a combination of a preburner furnace and a boiler.

A boiler which is designed to be fired by oil and/or gas commonly comprises a water cooled combustion tube, closed at one end and located within a water space of the boiler, an oil and/or gas burner being mounted in a panel such as a door at one end of the combustion tube, the flame being projected into the combustion tube. Upon reaching the closed end, the flame reverses direction and passes from the combustion tube into a smoke box at the end of the combustion tube adjacent the door, from where the flame, hot gases and other combustion products (herein referred to as hot gases) pass into water cooled smoke tubes, which extend through the water space of the boiler, and are eventually directed to a flue.

Boilers or furnaces which are fired by oil and/or gas have a positive flame characteristics in that they do not need a draught to induce the hot gases into the smoke tubes because the oil and/or gas is injected or introduced respectively, into the boiler or furnace continuously under pressure. However, boilers or furnaces which are fired by solid fuel normally have a negative flame characteristics in that it is necessary to induce a draught through the burning solid fuel.

Previously, converting a boiler which is specifically designed for oil and/or gas firing to solid fuel firing and achieving the rated output, has proved difficult for the following reasons.

First, a combustion tube of an oil and/or gas fired boiler is generally physically smaller than the equivalent solid fuel fired boiler for a given output as the calorific value of oil or gas is greater than solid fuel, and thus it is not necessary to burn such a great quantity of oil or gas at once.

Secondly, there is not a sufficient space to provide a fire bed in the combustion tube of an oil and/or gas fired boiler. If solid fuel were burnt in the smaller oil and/or gas fired boiler combustion tube, at least some of the combustion tube wall surface will be covered by the fire bed thereby reducing the effective wall area of the combustion tube which the hot gases can heat. Thus the efficiency of the boiler will be reduced and the boiler will not be able to achieve its rated output i.e. the boiler will be de-rated.

Thirdly, in solid fuel fired boilers it is normally necessary for solid fuel to be burnt along substantially the entire length of the combustion tube because, if solid fuel is only burnt at one end e.g. adjacent the door, the flame and hot gases produced would pass directly into the smoke box at that end and from there into the smoke tubes without satisfactorily heating the entire length of the combustion tube or reversing direction at the closed end thereof. Thus it is difficult to direct solid fuel to the closed end of the combustion tube of a boiler designed for oil and/or gas firing, and thus to ensure that the solid fuel is burnt along substantially the entire length thereof.

SUMMARY OF THE INVENTION

Accordingly, it is an object of the invention to provide a new or improved auxiliary furnace, a combination of an auxiliary furnace and a boiler, the boiler being designed for oil and/or gas firing, to convert a boiler for solid fuel firing.

According to a first aspect of the invention we provide an auxiliary furnace adapted for use with a boiler having a combustion tube, said furnace having a combustion chamber with means to introduce solid fuel into the combustion chamber, and an opening in the wall of the combustion chamber, said opening having an extension nozzle extending therefrom whereby hot gases may pass from the extension nozzle of the furnace into the combustion tube of a boiler at a position intermediate the ends of the combustion tube.

The length of the extension nozzle is preferably greater than the wall thickness of the furnace, although more preferably, the extension nozzle is of such length that it extends substantially two thirds along the length of the combustion tube of the boiler with which it is to be used.

By "length" we mean the distance the nozzle projects outwardly from the opening in the combustion chamber of the furnace.

Air may be directed from the combustion chamber of the furnace through the nozzle to provide a negative flame characteristic for the furnace.

It has been found that by utilising the invention, a boiler intended to be fired by oil and/or gas can be fired by solid fuel at its rated output and the above discussed difficulties are overcome or reduced. In particular, as the solid fuel is burnt in an auxiliary furnace, the fire bed does not de-rate the boiler or reduce its efficiency. Further, the usual positive flame characteristic of the boiler is changed to a negative flame characteristic, a draught being induced to draw the flame and hot gases produced in the furnace into the combustion tube of the boiler.

The furnace may be water cooled at least in part.

In one example, the combustion chamber has upper and lower regions (as herein defined), at least a part of the upper region thereof being lined with refractory material and the lower region of the chamber being cooled by water contained within a jacket surrounding at least a part of said lower region of the combustion chamber.

By "lower region" we mean a region at least below the fire bed and possibly extended upwardly beyond the fire bed. By "upper region" we mean a region not extending below the fire bed.

Thus such a furnace is a hybrid of a water cooled and a refractory-lined furance. By surrounding the lower region of the combustion chamber with a water jacket, this provides the advantage that the amount of heat lost to the water jacket is reduced as the area of the combustion chamber cooled by the water jacket is reduced, whilst the walls of the lower region of the furnace are cooled thereby preventing clinker and slag from adhering thereto. A further advantage is that the abrasion of solid fuel particles against the water-cooled walls of the lower region of the combustion chamber is a negligible consideration.

In a second example, the water cooling system of the furnace may comprise a water jacket which substantially envelopes the combustion chamber. However providing at least part of the upper region with a refractory lining, gives at least the following advantages.

First, clean combustion is encouraged, as smoke and other combustible gases given off from the solid fuel, are not cooled in the upper part of the furnace, and thus complete combustion is facilitated. This is of particular importance in high volatile fuels where the hydro carbons in the combustible gases are cracked thereby facilitating combustion and reducing sooting.

Secondly, heat produced as a result of combustion is not given up to a water jacket but reflected from the refractory material thus assisting in maintaining a high fire bed temperature and thus a high primary air temperature, to again facilitate combustion.

Thus the hybrid furnace defined above provides all the advantages of a water-cooled and refractory-lined furnace, whilst overcoming many of the disadvantages of these types of furnace.

Preferably, the means for introducing the solid fuel into the furnace comprises at least one channel which extends longitudinally along the length of the combustion chamber to ensure an even distribution of the fuel along the entire length of the combustion chamber. The channel or channels may extend through the water jacket from the exterior of the furnace where coal is supplied thereto, from for example, a hopper, to the interior of the combustion chamber.

The combustion chamber may be substantially cylindrical in section, the channel or channels being provided above a horizontal plane which contains the axis of the chamber.

Two channels may be provided, one either side of a vertical plane which contains the axis of the chamber.

The upper region of the combustion chamber which is lined with refractory material, may comprise at least part of the region which extends between and above said two channels.

In both the first and second examples described, the extension nozzle may also be water cooled by means comprising part of the water cooling system of the furnace.

Preferably the furnace is of the grateless type, a primary air supply being blown upwardly through nozzles in the bottom of the combustion chamber into the fire bed to enhance combustion, and secondary air being fed into the combustion chamber of the furnace above the level of the fire bed. In this case, the furnace may have an opening in the bottom thereof to permit removal of slag formed in the furnace.

The furnace may be provided with castors or wheels to permit easy removal of the furnace from the boiler for maintenance.

According to a second aspect of the invention we provide a combination of a boiler and an auxiliary furnace according to the first aspect of the invention, the boiler having a water cooled combustion tube located within a water space of the boiler, the tube being closed at one end thereof and having an opening at the other end, a smoke box communicating with the combustion tube at said other end, the nozzle of the furnace being of smaller external cross-sectional dimension than the internal cross-sectional dimension of the combustion tube, said nozzle extending through the opening in the combustion tube of the boiler to a position intermediate the ends of the combustion tube whereby, in use, hot gases produced in the furnace pass from the extension nozzle of the furnace into the combustion tube to the closed end thereof, reverse direction and pass through a space between the nozzle and the combustion tube over the nozzle to said smoke box.

The length of the combustion tube of the boiler may be slightly greater than the length of the combustion chamber of the furnace, and the extension nozzle may thus, in use, extend two thirds into the combustion tube although the nozzle may extend only halfway, or even less.

Where there is insufficient induced draught, a fan may be provided between the combustion tube of the boiler and the flue.

The boiler may have a door which when opened or removed allows the extension nozzle of the furnace to be introduced into the combustion tube of the boiler in airtight manner, but preferably the door will be removed and the boiler suitably modified to permit the combustion tube of the boiler and the combustion chamber of the furnace to be interconnected in airtight manner.

If desired, the water cooling system of the furnace and the water space of the boiler may be interconnected. It has been found that the output of the boiler can be raised by as much as 20% above its rated value in this arrangement.

Alternatively, the water cooling systems may be independent, the hot water from each system being used together for heating or other purposes thereby also increasing the efficiency of the boiler.

It can be seen that a boiler which, when oil and/or gas fired, has two passes i.e. the hot gases flow substantially in two directions in succession to heat the water in the boiler, one direction being provided by the combustion tube itself, and the other by a pass of smoke tubes which extend through the water space from the smoke box to communicate with the combustion tube of the boiler. Where the water cooling system of the furnace and the water space of the boiler are interconnected or where the water from both the water cooling system are utilised and where the nozzle is water cooled by means comprising part of the water cooling system of the furnace or a further independent system, the heated water also being utilised, the boiler will be converted from a boiler having two passes to to a boiler having three passes when solid fuel fired by the auxiliary furnace, the extra pass being provided by the nozzle of the furnace as the water cooling the nozzle is heated.

In general, where more than one pass of smoke tubes are provided e.g. X passes, the boiler will be converted from one having X passes to one having (X+1) passes.

According to a third aspect of the invention, we provide a method of converting a boiler having X passes to a boiler having (X+1) passes by utilising an auxiliary furnace according to the first aspect of the invention, the boiler comprising a water cooled combustion tube located within a water space of the boiler, the tube being closed at one end thereof and having an opening at the other end, a smoke box at the end of the combustion tube adjacent to the opening, the smoke box communicating with at least one pass of smoke tubes which extend through the water space, said nozzle of the furnace being of smaller external cross-sectional dimension than the internal cross-sectional dimension of the combustion tube, said nozzle being a water cooled system, the method including the step of introducing the extension nozzle extending from the opening of the furnace into the opening of the combustion tube of the boiler to provide a space between the wall of the combustion tube and the extension nozzle, interconnecting the water space of the boiler with the water cooling system of the nozzle whereby, in use, hot gases produced in the furnace pass through said extension nozzle into the combustion tube to the closed end thereof, reverse direction and pass over the extension nozzle through the said space into the smoke box and thereafter through said at least one pass of smoke tubes, to a flue.

According to a fourth aspect of the invention, we provide a method of firing by solid fuel a boiler designed for oil and/or gas firing, the boiler comprising a water cooled combustion tube located within a water space of the boiler, the tube being closed at one end thereof and having an opening at the other end, a smoke box at said other end of the combustion tube adjacent to the opening, said method utilising an auxiliary furnace according to a first aspect of the invention, said nozzle of the furnace being of smaller external cross-sectional dimension than the internal cross-sectional dimension of the combustion tube, the method including the step of introducing the extension nozzle of the furnace into the opening of the combustion tube of the boiler whereby, in use, hot gases produced in the furnace pass from the furnace into the combustion tube to the closed end thereof, reverse direction and pass through a space between the extension nozzle and the combustion tube, over the extension nozzle to said smoke box.

BRIEF DESCRIPTION OF THE DRAWINGS

The invention will now be described with the aid of the accompanying drawings in which.

DESCRIPTION OF THE PREFERRED EMBODIMENTS

Figure 1:
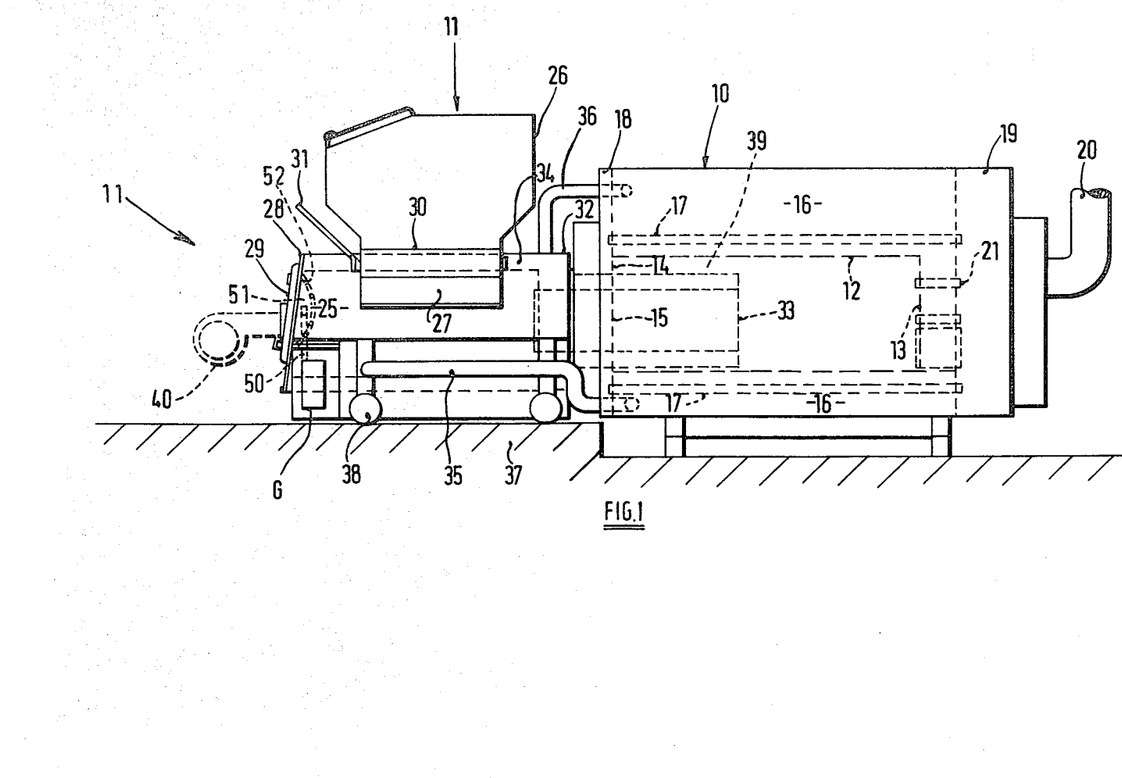
FIG. 1 is a side elevation of a furnace and a boiler combination embodying the invention.

Referring first to FIG. 1 of the drawings, there is shown a combination of a boiler 10 and an auxiliary solid-fuel fired furnace 11, herein referred to as the furnace.

The boiler 10 comprises a combustion tube 12 having a closed end 13, the other end 14 thereof having an opening 15. The boiler 10 is designed for oil and/or gas firing and is of overall smaller dimensions than would be a solid fuel fired boiler of the same rated output. In the boiler 10 shown, a door which closed the opening 15 having an oil and/or gas burner mounted therein, has been removed.

The boiler 10 is of elongate substantially cylindrical configuration, the combustion tube 12 being located within a water space 16 of the boiler through which a pass of smoke tubes 17 extend, in the longitudinal direction thereof, the tubes 17 opening at each end into smoke boxes 18 and 19 and surrounding the tube 12 in a circular arrangement.

The smoke box 18 at the end adjacent to and surrounding the opening 15, communicates with the combustion tube 12, and the smoke box 19 at the opposite end communicates with a flue 20.

Thus before the door is removed from the opening i.e. when the boiler is oil and/or gas fired, the boiler 10 is of the two pass type, the flame and hot gases being projected into the combustion tube 12 by the oil and/or gas burner mounted in the door. The flame and hot gases reverse direction as they reach the closed end 13 and whilst contacting the wall of the combustion tube 12 thereby provide a first heating pass. The hot gases then enter the smoke box 18 from where they pass along the smoke tubes 17 which provide the second heating pass, to the smoke box 19 and from there they enter the flue 20, whilst heating the water in the water space 16 continually as the flame and hot gases pass from the combustion tube 12 through the smoke tubes 17.

Several small pipes 21 are provided in and extend through the closed end 13 into the smoke box 19 to induce the hot gases and flame to pass along the combustion tube 12 to heat it along the entire length thereof.

Previously, firing this type of boiler with solid fuel at the rated output has provided difficult for the reasons discussed above.

To overcome these difficulties, an auxiliary furnace 11 is provided which is of the grateless type and comprises a combustion chamber 25 into which solid fuel is fed from a hopper 26 via two channels 27, one either side of the combustion chamber 25 to ensure that fuel is fed to and burnt along the entire length of the chamber 25.

The flow of fuel from the hopper 26 is regulated by gate valves 30 which are controlled manually by a handle 31 or automatically by solenoids activated by pressure or temperature thermostats of the furnace 11 and/or the boiler 10.

The fuel falls to the bottom of the chamber 25 where, when combusted, it forms a fire bed. Air is passed upwardly into the combustion chamber 25 through tubes welded in apertures in the bottom of the chamber 25 from a duct to which air is fed from a fan G. The duct has a dividing wall therein whereby the air from the fan G is divided into primary and secondary supplies, the primary supply passing into a reservoir from where it passes upwardly through the fire bed, and the secondary supply is passed into a further duct 50.

Dampers are provided in the duct to regulate the primary and secondary supplies.

As air passes from the reservoir upwardly through the tubes and thus into the fire bed on the bottom of the combustion chamber will have primary air, passed therethrough to assist in combustion and to maintain the entire fire bed at a high temperature.

The duct 50 extends to a hollow 51 in the slag door 29 wherein the secondary air passes into the slag door 29. The slag door 29 has apertures 52 therein whereby the secondary air supply passes into the combustion chamber above the level of the fire bed to further enhance combustion. It will be appreciated that the secondary air supply will be heated in the hollow door thereby increasing the efficiency of the furnace.

The secondary air supply will provide the furnace with a negative flame characteristic i.e. the flame and hot gases will be pushed by incoming air out of the chamber as hereinafter described, whereas solid fuel furnaces usually has a positive flame characteristic, i.e. air is drawn into the combustion chamber to assist in combustion as combustion takes place.

Slag, clinker and other non-combustibles may be removed from the furnace 11 via the slag door 29 at the forward end 28 of the combustion chamber 25.

At the other end 32 i.e. the rear end of the combustion chamber 25, there is an opening, an extension nozzle 33 extending therefrom which, in use, is inserted into the combustion tube 12 of the boiler 10 to permit the flame and hot gases from the combustion chamber 25 of the furnace 11 to pass into the combustion tube 12 of the the boiler 10.

Substantially the entire combustion chamber 25 is water cooled, the combustion chamber 25 being enveloped in a water jacket 34 having an inlet 35 and an outlet 36, the inlet and outlet being interconnected with the water space 16 of the boiler by pipework to provide a single water circulating system of the boiler and the furnace thereby to improve the efficiency of the furnace and boiler combination. The extension nozzle 33 is also water cooled, the water jacket thereof being connected with the of the water jacket 34 of the furnace 11.

The pipework is provided with quick release couplings (not shown) to facilitate removal of the furnace 11 from the boiler 10 for maintenance purposes.

In the example shown in FIG. 1, the level of the floor 37 beneath the furnace 11 has been built up so that the nozzle 33 of the furnace is at the correct height for insertion into the opening 15 of the combustion tube 12, and further, the furnace 11 is mounted on wheels 38 to further facilitate removal. This may not be necessary with all furnaces.

It can be seen that the extension nozzle 33 is of substantially the same length as the combustion chamber 25 of the furnace 11, which is itself substantially half the length of the combustion tube 12 of the boiler. Thus the extension nozzle 33 extends substantially halfway into the combustion tube 12.

Flame and hot gases from the furnace 11 will pass through the water cooled nozzle 33 to provide a first heating pass into the boiler 10 and pass to the closed end 13 of the tube 12 thereby to provide a second heating pass, reverse direction and pass back over the water cooled nozzle 33 through space 39 between the external wall of the nozzle 33 and the internal wall of the tube 12, into the smoke box 18 and hence through smoke tubes 17 to the flue 20 to provide a third heating pass.

Thus the two pass boiler shown will be converted to a three pass boiler when solid fuel fired by the furnace 11 by virtue of the nozzle 33, the extra pass being provided by virtue of the fact of the interconnection of the water cooling system of the furnace and the water space of the boiler, the extension nozzle 33 being cooled by water of the water cooling system of the furnace.

In general, it will be appreciated that where a boiler has more than one pass of smoke tubes, i.e. if the boiler is of the X pass type when oil and/or gas fired, that the boiler will be of the (X+1) pass type when solid fuel fired by the furnace 11 as shown.

A fan may be provided in addition to fan G between the combustion tube 12 of the boiler 10 and the flue, 20 to increase the draught induced, if needed.

If desired, an oil and/or gas burner 40 may be mounted on the door 29 of the furnace 11 as shown in dotted lines, so that the boiler 10 can be conventionally oil or gas fired if desired, and/or to provide a quick start up of the furnace 11.

Although the nozzle 33 has been described as extending half way into the combustion tube 12 of the boiler, if required the dimensions of the boiler furnace, and nozzle may be different in which case the nozzle will extend into the tube 12 a different amount. Such an alternative embodiment is shown in FIG. 2.

Figure 2:
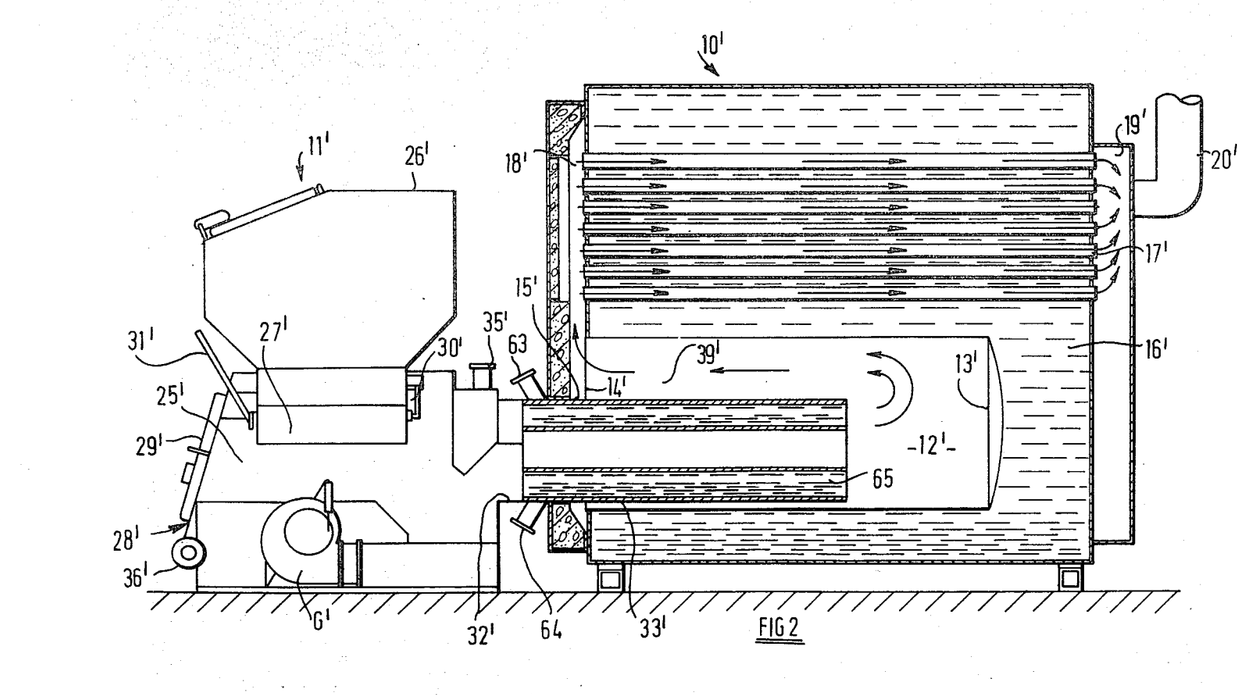
FIG. 2 is a side elevation of an alternative furnace and boiler combination embodying the invention.

Referring to FIG. 2 of the drawing, there is shown an alternative boiler 10' and an auxiliary solid-fuel fired furnace 11' combination. Similar parts to the combination of FIG. 1 are indicated by similar reference numerals with a prime sign added.

The boiler 10' comprises a combustion tube 12' having a closed end 13', the other end 14' thereof having an opening 15'. Like the boiler 10 of FIG. 1, the boiler 10' is designed for oil and/or gas firing and is of smaller overall smaller dimensions than would be a solid fuel fired boiler of the same rated output.

The boiler 10' is also of elongate substantially cylindrical configuration, the combustion tube 12' being located within a water space 16' of the boiler through which a pass of smoke tubes 17' extend, in the longitudinal direction thereof, the tubes 17' opening at each end into smoke boxes 18' and 19'. The smoke tubes 17' do not surround the tube 12' as do the tubes 17 of the boiler 10 of FIG. 1, but are in an overhead arrangement. The water space 16' has inlet and outlet flow connectors (not shown).

The smoke box 18' at the end adjacent to and surrounding the opening 15', communicates with the combustion tube 12', and the smoke box 19' at the opposite end communicates with a flue 20'.

The auxiliary furnace 11' is of the type comprising a combustion chamber 25' which is substantially unrestricted, for example, by any grate along, at least a major portion of its length, into which solid fuel is fed from a hopper 26' via two channels 27', one either side of the combustion chamber 25' to ensure that fuel is fed to and burnt along the entire length of the chamber 25'.

The flow of fuel from the hopper 26' is regulated by gate valves 30' which are controlled manually by a handle 31' or automatically by solenoids activated by pressure or temperature thermostats of the furnace 11' and/or the boiler 10'.

The fuel falls to the bottom of the chamber 25' where, when combusted, it forms a fire bed. Air is passed upwardly into the combustion chamber 25' through tubes welded in apertures in the bottom of the chamber 25' from a duct to which air is fed from a fan G' and a secondary supply is passed into the combustion chamber 25' from a further duct (not shown) above the level of the fire bed.

Slag, clinker and other non-combustibles may be removed from the furnace 11' via a slag door 29' at the forward end 28' of the combustion chamber 25'.

At the rear end 32' of the combustion chamber 25'. there is an opening, an extension nozzle 33' extending therefrom which, in use, is inserted into the combustion tube 12' of the boiler 10' to permit the flame and hot gases from the combustion chamber 25' of the furnace 11' to pass into the combustion tube 12' of the boiler 10'.

Substantially the entire combustion chamber 25' is water cooled, the combustion chamber 25' being enveloped in a water jacket having an inlet 35' and an outlet 36'. The extension nozzle 33' is also water cooled, the water jacket 65 thereof having inlet 63 and outlet 64 flow connectors.

In the example shown in FIG. 2, the level of the nozzle 33' is arranged so that the nozzle 33' of the furnace 11' is at the correct height for insertion into the opening 15' of the combustion tube 12'.

The nozzle 33' is separable from the remainder of the furnace 11' unlike the nozzle 33 of the furnace 11 of FIG. 1. This is facilitated because the water jacket of the furnace 11', and the water jacket 65 of the nozzle 33', are not interconnected. Further, the jackets are independent of of the water space 16' of the boiler 10' hence facilitating removal of the furnace 11' from the boiler for maintenance.

The hot wate from the jacket of the furnace 11', the jacket 65 of the nozzle 33', and the water space 16' of the boiler 10' are all fed in parallel to be used for heating or as desired.

It can be seen that the length of the extension nozzle 33' in this example is such that the extension nozzle 33' extends approximately two thirds into the combustion tube 12'. Flame and hot gases from the furnace 11' will pass through the water cooled nozzle 33' to provide a first heating pass into the boiler 10' and pass to the closed end 13' of the tube 12', thereby to provide a second heating pass, reverse direction and pass back over the water cooled nozzle 33' through space 39' between the external wall of the nozzle 33' and the internal wall of the tube 12', into the smoke box 18' and hence through smoke tubes 17' to the flue 20' to provide a third heating pass.

Thus this two pass boiler will also be converted to a three pass boiler when solid fuel fired by the furnace 11' by virtue of the nozzle 33', the extra pass being provided by virtue of the fact that hot water from the nozzle 33' and furnace is utilised along with hot water from the water space 16' of the boiler 10'.

Because the nozzle 33' is being heated both from within and by the hot gases in space 39', a pump may be necessary to increase the water flow and hence cooling capability of the jacket 65.

Various modifications may be made to the combination of FIG. 1 or FIG. 2, without departing from the scope of the invention. For example, instead of providing a nozzle 33 or 33' in the form of a cylinder surrounded by a water jacket, the nozzle 33, 33' may comprise a plurality of smoke tubes enveloped in a water jacket. The nozzle 33, 33' need not be cylindrical, but may be triangular, elliptical, hexagonal or other polygonial in section.

Further, where it is not desired or necessary to increase the number of passes of the boiler, for example where de-rating of the boiler is not detrimental, the nozzle may be provided without a water jacket but refractory lined.

Different lengths of nozzle 33, 33' may be used if desired but as a minimum, the nozzle 33, 33' will need to extend at least a distance equal to the thickness of the wall of the furnace 11, 11' so that the flame and hot gases can be transferred from the furnace 11' into the combustion chamber 12' of the boiler 10'. However, the nozzle 33, 33' may be of any greater length provided that there is space adjacent the closed end of the tube 12, 12' in which the hot gases can charge direction.

Thus an oil or gas fired boiler can be solid-fuel fired and operated at its rated output. It has been found that the furnace/boiler combinations described have an output up to 20% higher than the rated output of the boiler 10, 10' when conventionally oil or gas fired, where the water cooling systems of the nozzle, furnace and boilers are interconnected or where the hot water from nozzle and furnace are also used for heating.

Figure 3:
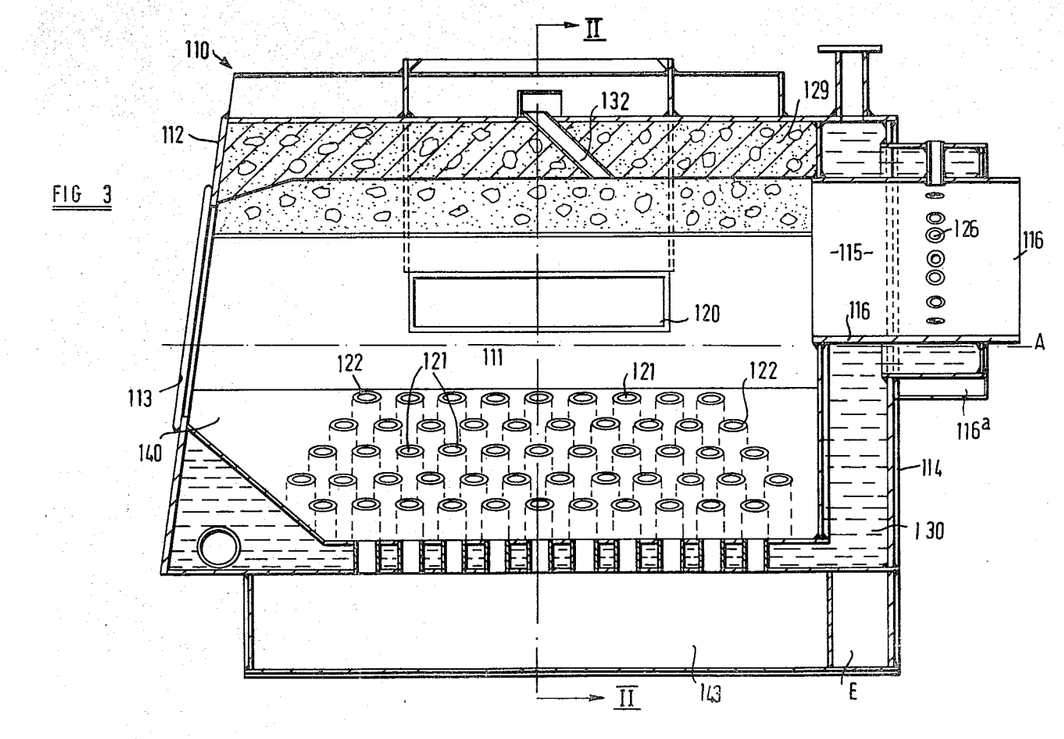
FIG. 3 is a side elevation of an auxiliary furnace which may be utilised in the combination of FIGS. 1 and 2.
Figure 4:
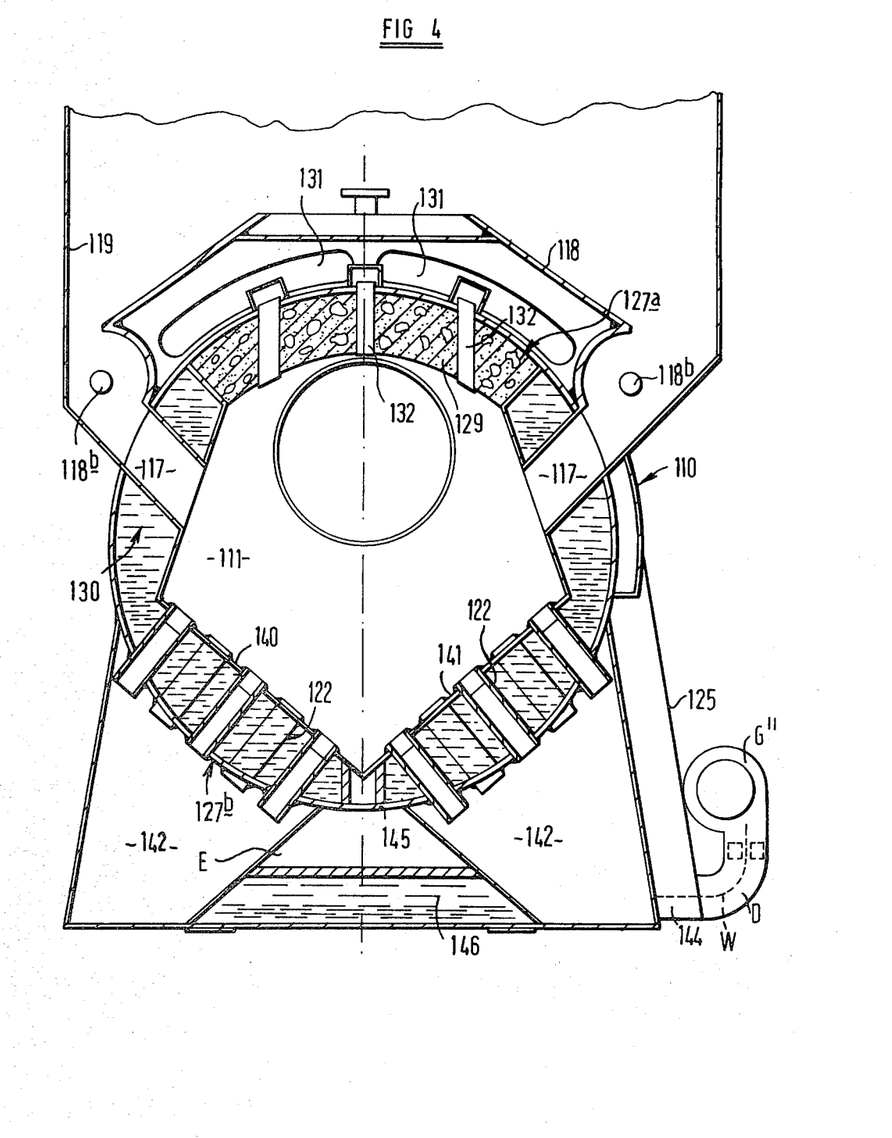
FIG. 4 is a section on the line II—II of FIG. 3.

Referring now to FIGS. 3 and 4, there is shown an alternative furnace 100 which may be used in place of furnaces 10 or 10' of FIGS. 1 and 2.

The furnace 110 is again of the type comprising an elongate, substantially cylindrical combustion chamber 111 which is substantially unrestricted along at least a major portion of its length, and the chamber 111 has a central axis A. At the forward end 112, a hollow slag door 113 is provided to permit access to the interior of the furnace 10 for maintenance purposes. At the rear end 114 of the combustion chamber 111, an exhaust opening 115 is provided whereby hot gases may pass from the furnace 110 into a boiler and be used, for example to heat water. A nozzle 116 which is adapted to extend into a heating chamber of the boiler, is located in the opening 115 and is partially water cooled and partially cooled by tertiary air as described below. The spent gases are passed from the boiler to a flue.

Two channels 117 are provided which extend from the exterior of the furnace into the combustion chamber 111 and solid fuel may pass from a hopper 119 located above the furnace (only shown in FIG. 2) via inverted channel-shaped guide 118 through the channels 117 into the combustion chamber 111, the flow being regulated by gate valves 120 rotatable about pivots 118b which may be controlled manually via handles (not shown) or automatically by solenoids actuated by pressure or temperature thermostats of the furnace or boiler and/or an electronic control circuit which may be programmed to control the furnace so that the boiler provides a predetermined output for a predetermined time.

The solid fuel falls downwardly towards the bottom of the combustion chamber 111 and forms a bed of fuel which, when combusted, provides a fire bed.

The channels 117 are each located either side of and equidistant from a vertical plane V and just above a horizontal plane containing axis A.

The bottom of the combustion chamber 111 is of V configuration and the sides 140, 141 of the V each have a plurality of apertures 121 in which tubes 122 comprising nozzles which extend generally downwards to air reservoirs 142, 143, are welded. The reservoir 142 has an inlet 44 which communicates with a duct D to which air is fed from a fan G". The duct D has a dividing wall W therein whereby the air from the fan G is divided into primary and secondary supplies, the primary supply passing to inlet 144 and thus into reservoir 142, and the secondary supply is passed into a further duct 125.

Air from the reservoir 142 passes to reservoir 143 by a duct E at the rear 114 of the furnace 110, and thus air from both reservoirs 142, 143 passes upwardly through the nozzles 122 and through the fire bed on the bottom of the combustion chamber 111, said air comprising a primary air supply which assists in combustion and maintains the entire fire bed at a high temperature.

The further duct 125 extends from the duct D to spaces 131 in the roof of the furnace 110 wherein the secondary air passes downwardly through apertures 132 into the combustion chamber 111 above the level of the fire bed to further enhance combustion. It will be appreciated that the secondary air supply will be heated in the spaces 131 thereby increasing the efficiency of the furnace.

A still further duct (not shown) directs a proportion of the primary air from the reservoirs 142, 143 to the nozzle 116 at the rear 114 of the furnace 110 to provide a tertiary air supply which is circulated around a hollow 116a of the nozzle 116 whereby the tertiary air is heated and the nozzle 116 cooled. The tertiary air then passes through holes 126 in the nozzle 116 into the opening 115 to create a cyclone to ensure proper mixing of the hot gases and complete combustion of the fuel particles contained therein.

The combustion chmamber 111 is divided into two regions, an upper region 127a and a lower region 127b.

Part of the upper region 127a of the combustion chamber 111, i.e. the region above the channels 117, is lined with a layer of refractory material 129 of the type known as Durax 1600 concrete. Thus the walls of the upper region 127a of the combustion chamber are protected from heat damage.

The lower region 127b of the combustion chamber, i.e. the region below the channel 117, is provided with a water jacket 130 having an inlet (not shown) and an outlet (not shown) to cool the walls of the lower region 127b of the chamber 111. The primary air supply nozzles 122, the channels 117 and a part 116b of the nozzle 116 in the exhaust opening 115, extend through the water jacket 130 and are thus cooled thereby.

Thus, this furnace 110 is also a hybrid between a water-cooled furnace wherein the entire combustion chamber is enveloped in a water jacket to cool the entire wall surface thereof, and a refractory-lined furnace wherein the entire internal surface of the combustion chamber is lined with refractory material.

At the apex of the V at the bottom of the chamber 111 there is an opening 145 which extends along substantially the entire length of the combustion chamber 111, through which slag produced during combustion of the solid fuel, may pass and be removed from the furnace. Thus as new fuel is fed into the chamber 111 from the hopper 119, burnt fuel and other non-combustibles will move in the fire bed under gravity towards the apex of the V and be converted to slag which will eventually pass through the opening 145 and be removed from the furnace.

A water cooled clinker tray 146 may be placed beneath the opening 145 to facilitate disposal of the slag. However, if desired, a conveyor or container may be placed beneath the opening 145.

Although the bottom of the combustion chamber 111 has been described as being in a V formation, if desired, any other configuration having a downwardly inclined part to direct the slag and other non-combustibles to an opening in a low part of the combustion chamber may be used. Further, although the opening 145 has been described as extending over substantially the entire length of the combustion chamber 111, if desired, the opening 145 may extend over part or parts of the length of the combustion chamber 111 only.

Although in the furnaces 110, described above, the extent to which the combustion chamber is refractory lines has been described as comprising the region or part of the region between the channels 117 respectively, a greater or lesser region may be refractory lined, as desired.

Further, in each case the furnace 110, has been described as being cylindrical but if desired, furnaces of another suitable shape may be used.

The means for supplying solid fuel to the combustion chamber 111 has been described as comprising a hopper 119, but any other means may be employed, although the means described provide the advantage that an even flow of fuel is provided to both sides of the furnace 110, along the entire length thereof.

It can be seen that this furnace 110 may replace either furnace 10 or 10' of FIGS. 1 and 2 respectively and it will be appreciated that the water jacket 130 of the furnace 110 may be connected with the water space of the boiler to provide a single circulating system, or the water heated in jacket 130 may be utilised with the water of the boiler. In either case, the water circulating systems are interconnected, in the former case, in series, and in the latter case, in parallel.

I claim:

1. A combination of a boiler and an auxiliary furnace, the auxiliary furnace comprising a combustion chamber, means to inroduce solid fuel into the combustion chamber, and an opening in a wall of the combustion chamber, said opening having an extension nozzle extending therefrom, the boiler having a water cooled combustion tube located within a water space of the boiler, the tube being substantially closed at one end thereof and having an opening at the other end, a smoke box communicating with the combustion tube at said other end, the nozzle of the furnace being of smaller external cross-sectional dimension than the internal cross-sectional dimension of the combustion tube and including means interconnected with the water space of the boiler for utilizing boiler water to water cool said nozzle, said nozzle extending through the opening in the combustion tube of the boiler toward said substantially closed end such a distance that, in use, hot gases produced in the furnace heat boiler water as they pass from the extension nozzle of the furnace into the combustion tube to the substantially closed end thereof, reverse direction and pass through a space between the nozzle and the combustion tube over the nozzle to said smoke box.

2. A combination according to claim 1 wherein the length of the combustion tube of the boiler is slightly greater than the length of the combustion chamber of the furnace.

3. A combination according to claim 1 wherein the furnace is water cooled at least in part, the water cooling system of the furnace being interconnected with the water space of the boiler and the water cooled nozzle to provide a single water circuitry system.

4. A combination according to claim 1 wherein the furnace is of the type having a combustion chamber which is substantially internally unrestricted along at least a major portion of its length, a primary air supply being blown upwardly through nozzles in the bottom of the combustion chamber into the fire bed to enhance combustion, and secondary air being fed into the combustion chamber of the furnace above the level of the fire bed.

5. A combination according to claim 4 wherein the length of the extension nozzle of the furnace is not less than the length of the combustion chamber of the furnace.

6. A combination according to claim 1 wherein the furnace is water cooled at least in part.

7. A combination according to claim 6 wherein the combustion chamber of the furnace has upper and lower regions (as herein defined), at least a part of the upper region thereof being lined with refractory material and the lower region of the chamber being cooled by water contained within a jacket surrounding at least a part of said lower region of the combustion chamber.

8. A combination according to claim 1 wherein the means for introducing the solid fuel into the furnace comprises at least one channel which extends longitudinally along the length of the combustion chamber to ensure an even distribution of the fuel along the entire length of the combustion chamber, said at least one channel extending through the water jacket from the exterior of the furnace, where coal is supplied thereto, to the interior of the combustion chamber.

9. A combination according to claim 8 wherein the combustion chamber of the furnace is substantially cylindrical in section, said at least one channel being provided above a horizontal plane which contains the axis of the chamber.

10. A combination according to claim 8 or claim 9 wherein two channels are provided for feeding solid fuel into the combustion chamber of the furnace, one either side of a vertical plane which contains the axis of the chamber, an upper region of the combustion chamber being lined with refractory material comprising at least part of the region which extends between and above said two channels.

11. A method of converting a boiler having X passes to a boiler having (X+1) passes by utilising an auxiliary furnace comprising a combustion chamber, means to introduce solid fuel into the combustion chamber, and an opening in a wall of the combustion chamber, said opening having an extension nozzle extending therefrom, the boiler comprising a water cooled combustion tube located within a water space of the boiler the tube being substantially closed at one end thereof and having an opening at the other end, a smoke box at the end of the combustion tube adjacent to the opening, the smoke box communicating with at least one pass of smoke tubes which extend through the water space, and said nozzle of the furnace being of smaller external cross-sectional dimension than the internal cross-sectional dimension of the combustion tube and said nozzle being water cooled, the method including the steps of introducing the extension nozzle extending from the opening of the furnace into the opening of the combustion tube of the boiler to provide a space between the wall of the combustion tube and the extension nozzle, interconnecting the water space of the boiler with the water cooling system of the nozzle whereby, in use, hot gases produced in the furnace pass through said extension nozzle into the combustion tube to the substantially closed end thereof, reverse direction and pass over the extension nozzle through the said space into the smoke box and thereafter through said at least one pass of smoke tubes, to a flue.

* * * * *

UNITED STATES PATENT OFFICE
CERTIFICATE OF CORRECTION

PATENT NO. : 4,470,359
DATED : September 11, 1984
INVENTOR(S) : Trevor D. Smith

It is certified that error appears in the above-identified patent and that said Letters Patent are hereby corrected as shown below:

On the cover page, insert:

-- [30]   Foreign Application Priority Data

Aug. 19, 1980 [GB]  United Kingdom..............8026926
  Aug. 19, 1980 [GB]  United Kingdom..............8026927
  Aug. 19, 1980 [GB]  United Kingdom..............8026928 --.

Column 12, line 13, delete "inroduce" and substitute

--introduce--.

Signed and Sealed this

Second Day of April 1985

[SEAL]

Attest:

DONALD J. QUIGG

Attesting Officer      Acting Commissioner of Patents and Trademarks